(12) United States Patent
Krishnaswamy

(10) Patent No.: US 7,536,233 B1
(45) Date of Patent: May 19, 2009

(54) METHOD AND APPARATUS FOR ADJUSTING PROCESSING SPEEDS BASED ON WORK-IN-PROCESS LEVELS

(75) Inventor: Chandra Shekar Krishnaswamy, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 557 days.

(21) Appl. No.: 11/342,757

(22) Filed: Jan. 30, 2006

(51) Int. Cl.
*G06F 19/00* (2006.01)
*G05B 19/25* (2006.01)

(52) U.S. Cl. .................. 700/100; 700/109; 700/121; 318/571

(58) Field of Classification Search .................. 700/95, 700/97, 99, 100, 101, 109, 117, 121, 127, 700/159, 182, 186, 190, 193, 214; 705/7–9; 318/560, 567, 569, 570, 571; 438/106, 109
See application file for complete search history.

(56) References Cited

U.S. PATENT DOCUMENTS

| | | | | |
|---|---|---|---|---|
| 4,135,346 A | * | 1/1979 | Rebsamen | 53/494 |
| 5,698,152 A | * | 12/1997 | Taruno et al. | 264/272.11 |
| 5,966,694 A | * | 10/1999 | Rothschild et al. | 705/7 |
| 5,980,183 A | * | 11/1999 | Fosnight | 414/222.01 |
| 6,285,437 B1 | * | 9/2001 | Tokunaga | 355/53 |
| 6,317,643 B1 | * | 11/2001 | Dmochowski | 700/121 |
| 6,358,126 B1 | * | 3/2002 | Jackson et al. | 451/65 |
| 6,438,436 B1 | * | 8/2002 | Hohkibara et al. | 700/97 |
| 6,447,370 B1 | * | 9/2002 | Weldon | 451/6 |
| 6,670,807 B2 | * | 12/2003 | Cox | 324/207.26 |
| 6,682,408 B2 | * | 1/2004 | Sakurai et al. | 451/67 |
| 6,732,001 B2 | * | 5/2004 | Yamaguchi | 700/109 |
| 7,262,080 B2 | * | 8/2007 | Go et al. | 438/109 |
| 7,320,423 B2 | * | 1/2008 | Suresh et al. | 228/4.5 |
| 7,320,424 B2 | * | 1/2008 | Beatson et al. | 228/4.5 |
| 2006/0284301 A1 | * | 12/2006 | Corisis | 257/690 |
| 2007/0111374 A1 | * | 5/2007 | Islam et al. | 438/106 |

FOREIGN PATENT DOCUMENTS

| | | | | |
|---|---|---|---|---|
| DE | 2816648 A | * | 10/1979 | |
| JP | 11347891 A | * | 12/1999 | |
| JP | 2002190510 A | * | 7/2002 | |
| WO | WO 2007054361 A1 | * | 5/2007 | |

* cited by examiner

*Primary Examiner*—Crystal J Barnes-Bullock
(74) *Attorney, Agent, or Firm*—Williams, Morgan & Amerson

(57) ABSTRACT

The present invention provides a method and apparatus for adjusting tool processing speeds based on work-in-process levels. The method includes determining at least one work-in-process level associated with a first processing tool and modifying a processing speed associated with the first processing tool based on said at least one work-in-process level.

28 Claims, 5 Drawing Sheets

METHOD AND APPARATUS FOR ADJUSTING PROCESSING SPEEDS BASED ON WORK-IN-PROCESS LEVELS

BACKGROUND OF THE INVENTION

1. Field of the Invention

This invention relates generally to semiconductor processing and, more particularly, to adjusting processing speeds based on work-in-process levels during semiconductor processing.

2. Description of the Related Art

To fabricate a semiconductor device, a wafer is typically processed through numerous processing tools in a predetermined sequence. The processing tools may include photolithography steppers, etch tools, deposition tools, polishing tools, rapid thermal anneal tools, ion implantation tools, and the like. Each processing tool modifies the wafer according to a particular operating recipe. For example, a photolithography stepper may be used to form a patterned layer of photoresist above the wafer. Features in the patterned layer of photoresist correspond to a plurality of features, e.g. gate electrode structures, which will ultimately be formed above the surface of the wafer. For example, an etching tool may be used to etch portions of the patterned layer to form features, e.g. portions of gate electrode structures, in the patterned layer.

The processing tool sequence, as well as the recipes used by the processing tools, must be carefully controlled so that the features formed on the wafer meet appropriate design and performance criteria. Thus, advanced process control (APC) systems are often used to coordinate operation of the processing tools. However, the processing tool recipes are typically predetermined and provided to the processing tools before they begin processing wafers. For example, the operating recipe may indicate a processing speed associated with the processing tool, e.g., the number of wafers or wafer lots that may be processed in the processing tool in a given time period. The quality of the products formed by the processing tool may be reduced when the predetermined recipe is not changed in response to changing conditions in the fabrication facility. For example, the accuracy or quality of the processing performed by the processing tool is generally inversely related to the processing speed of the processing tool. The predetermined recipe may therefore be selected so that the processing tool may process a relatively large number of wafers or wafer lots at a relatively low, but acceptable, level of accuracy. However, if changing factory conditions result in a smaller than predicted number of wafers or wafer lots being provided to the processing tool for processing, these wafers or wafer lots may still be processed at the relatively high speed and relatively low level of accuracy.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for adjusting tool processing speeds based on work-in-process levels. The method includes determining at least one work-in-process level associated with a first processing tool and modifying a processing speed associated with the first processing tool based on said at least one work-in-process level.

In another embodiment of the present invention, an apparatus is provided for adjusting tool processing speeds based on work-in-process levels. The apparatus includes a first processing tool and a control unit. The control unit is configured to determine at least one work-in-process level associated with the first processing tool and modify a processing speed associated with the first processing tool based on said at least one work-in-process level.

BRIEF DESCRIPTION OF THE DRAWINGS

The invention may be understood by reference to the following description taken in conjunction with the accompanying drawings, in which like reference numerals identify like elements, and in which.

Figure 1:
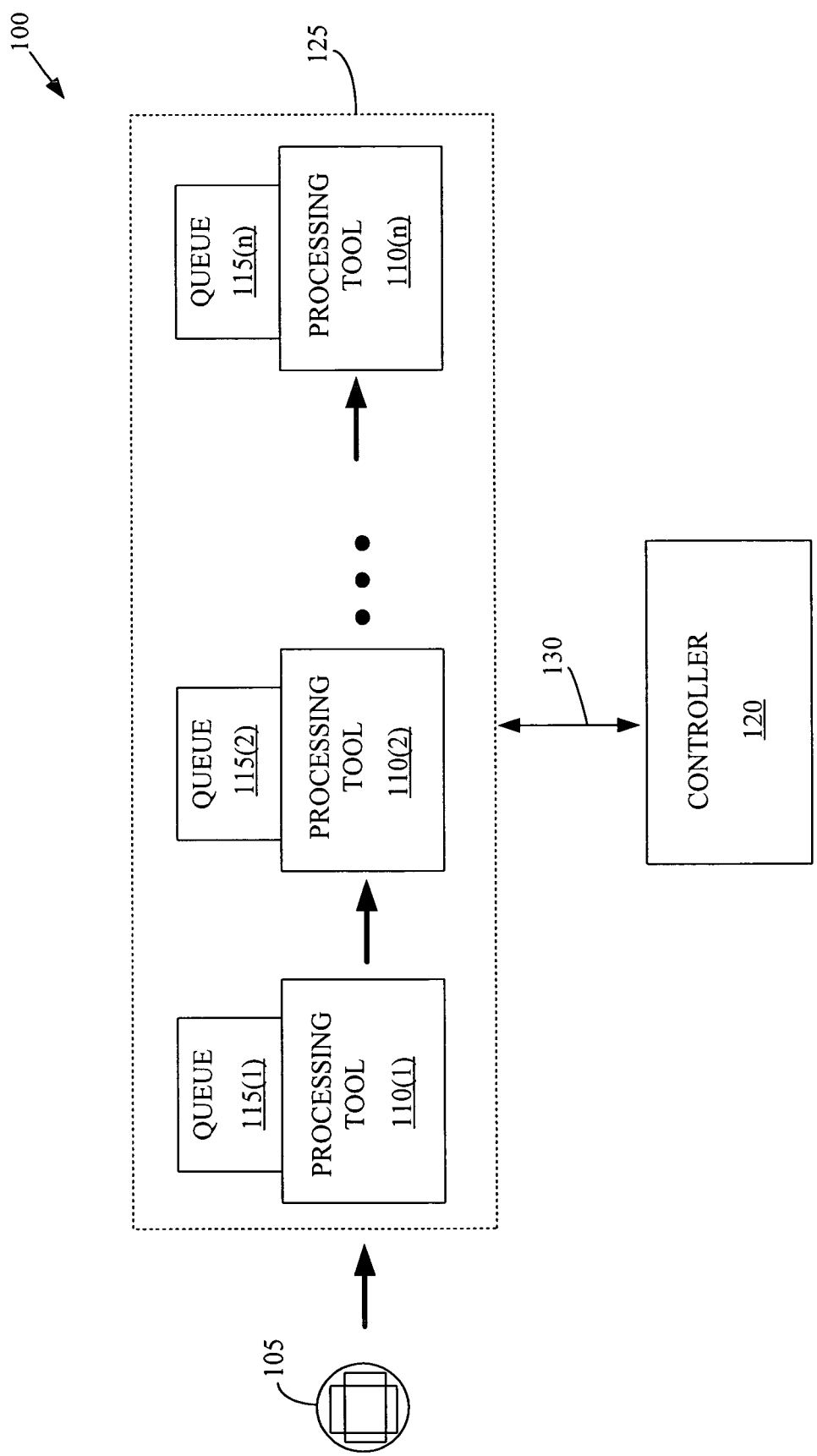
FIG. 1 shows a simplified block diagram of an illustrative manufacturing system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 shows a simplified block diagram of an illustrative manufacturing system 100. Although the invention is described as it may be implemented in a semiconductor fabrication facility, the invention is not so limited and may be applied to other manufacturing environments. In the illustrated embodiment, the manufacturing system 100 is configured to fabricate semiconductor devices in or on one or more wafers 105. The particular type of semiconductor devices, or products, formed in or on the wafers 105 are not material to the present invention and, in various embodiments, may include any type of product. In various alternative embodiments, the techniques described herein may be applied to a variety of workpieces or manufactured items to form products including, but not limited to, microprocessors, memory devices, digital signal processors, application specific integrated circuits (ASICs), or other similar devices. The techniques may also be applied to workpieces or manufactured items other than semiconductor devices. Persons of ordinary skill in the art having benefit of the present disclosure should appreciate that, in various embodiments, the wafers 105 may represent individual wafers, multiple wafers, one or more wafer lots, or any other number and/or grouping of wafers.

The manufacturing system 100 includes one or more processing tools 110(1-$n$) that may be used to form one or more products, or portions thereof, in or on the wafers 105. Hereinafter, the indices (1-$n$) may be used to indicate individual processing tools 110 or subsets thereof. However, the indices (1-$n$) may be dropped when referring to the processing tools 110 collectively. The same convention will be applied to other groups of elements that are referred to by a numeral and a distinguishing index. In various alternative embodiments, the manufacturing system 100 may include any number of processing tools 110 of any type, including lithography tools, deposition tools, etching tools, polishing tools, annealing tools, and the like. Although not shown in the illustrated embodiment, the manufacturing system 100 may also include one or more metrology tools (not shown) such as scatterometers, ellipsometers, scanning electron microscopes, and the like. Techniques for operating the processing tools 110 and metrology tools are known in the art and, in the interest of clarity, only those aspects of the operation of these devices that are relevant to the present invention will be discussed further herein.

The processing tools 110 may include, or be associated with, one or more queues 115(1-$n$) that indicate the wafers 105 that are waiting to be processed by the associated processing tool 110. In one embodiment, the queues 115 include one or more chambers that may store one or more wafers 105 while they are waiting to be processed in the associated processing tool 110. The waiting wafers 105 may then be provided to the associated processing tool 110 when the processing tool 110 is ready to process the wafer 105. However, the present invention is not limited to queues 115 that include chambers or other entities for storing wafers 105. In alternative embodiments, the queues 115 may be databases or lists that include information indicating which wafers 105 are waiting to be processed in each processing tool 110. Accordingly, the queues 115 may be implemented in any combination of hardware, firmware, and/or software. Furthermore, persons of ordinary skill in the art having benefit of the present disclosure should appreciate that the present invention is not limited to a one-to-one correlation of the processing tools 110 and the queues 115. In alternative embodiments, any number of queues 115 may be used to store and/or indicate the wafers 105 that are waiting to be processed in the processing tools 115.

A controller 120 is communicatively coupled to the processing tools 110 and/or the queues 115 in a processing flow 125, as indicated by the arrow 130 and the dashed box 125. In the interest of clarity, the individual connections between the controller 120, the processing tools 110, and/or the queues 115 are not shown in FIG. 1. However, persons of ordinary skill in the art are able to configure the manufacturing system 100 to provide the required interconnections to establish a communicative coupling between the controller 120, the processing tools 110, and/or the queues 115. In various alternative embodiments, the controller 120 may be implemented in a computing device such as a desktop computer, a laptop computer, and the like. However, persons of ordinary skill in the art should appreciate that, in alternative embodiments, portions of the controller 120 may be implemented in any number of devices and/or locations using any combination of hardware, firmware, and/or software.

In operation, a product may be formed on the wafer 105 by providing the wafer 105 to the processing tools 110. The queues 115 may include wafers 105 waiting to be processed, or information indicating the wafers 105 that are waiting to be processed. The processing tools 110 may perform the operations required to form the product on the wafer 105 according to a recipe provided by the controller 120. For example, the processing tools 110 may be used to form a microprocessor on the wafer 105 using a microprocessor recipe provided by the controller 120. In alternative embodiments, the processing tools 110 (either separately or in combination) may be used to form any number of products. For example, the processing tools 110 may be used to form an ASIC using an ASIC recipe provided by the controller 120. For another example, the processing tool 110(1) may be used in conjunction with the processing tool 110(*n*), as well as other processing tools not shown in FIG. 1, to form a memory element according to a memory element recipe provided by the controller 120.

The wafers 105 may be provided to the manufacturing system 100 at different rates or volumes. For example, approximately 200 wafers 105 may be provided to the manufacturing system 100 each week to form approximately 200 products on the wafers 105 each week. The wafers 105 are then provided to the processing tools 110 in the processing flow 125 in a sequence determined by a processing or operating recipe. Different wafers 105 may take different paths through the processing flow 120 (or other flows and/or tools not shown in FIG. 1) and so the number of wafers 105 being processed by each processing tool 110 (or waiting to be processed) may be different for each processing tool 110. In accordance with common usage in the art, the rate at which wafers 105 are being provided to and/or processed by the processing tools 110 manufacturing system 100 will be referred to hereinafter as a work-in-process level associated with the processing tool 110. Persons of ordinary skill in the art should appreciate that the rate or volume of wafers 105 provided to the manufacturing system 100 is a matter of design choice and not material to the present invention.

The work-in-process level associated with each processing tool 110 may be determined using any available information. For example, the work-in-process level associated with each processing tool 110 may be determined based on an anticipated rate or volume of wafers 105 being provided to the manufacturing system 100 and/or individual processing tools 110, the number of wafers 105 being processed by the processing tool 110, the number of wafers 105 in a queue 115 waiting to be processed by the processing tool 110, numbers of wafers 105 being processed in other processing tools 110 in the process flow 125, numbers of wafers 105 queued for processing in other processing tools 110 in the process flow 125, numbers of wafers 105 that are on hold waiting for a decision regarding processing, and the like. The specific techniques or algorithms used to determine the work-in-process level associated with each processing tool 110 are, however, matters of design choice and not material to the present invention.

Processing speeds for each of the processing tools 110 may be set based on the initial expected work-in-process level associated with the processing tools 110. For example, the controller 120 may set the initial processing speed for each processing tool 110 at approximately one wafer per hour if the work-in-process level for the process flow 125 is approximately 100 wafers per week. However, the work-in-process levels associated with the processing tools 110 may change over time. Accordingly, the controller 120 may be configured to access work-in-process levels associated with the processing tools 110 (e.g., during processing) and modify one or more processing speeds associated with the processing tools 110 based on the work-in-process levels associated with the processing tools 110, the process flow 125, and/or the manufacturing system 100. In one embodiment, the processing speeds (or other parameters that may affect the processing speed) may be varied within predetermined ranges or based on one or more thresholds.

Figure 2:
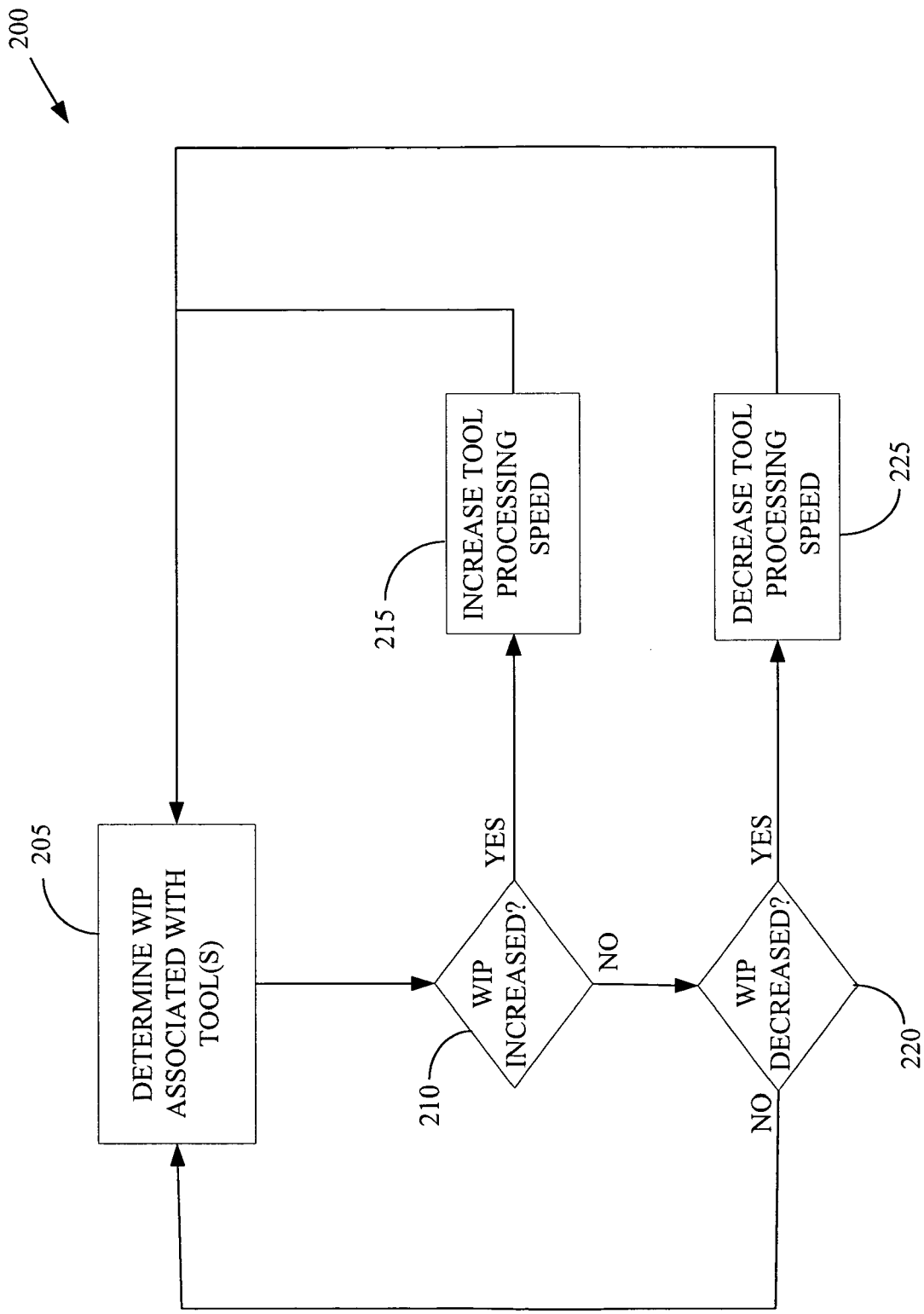
FIG. 2 conceptually illustrates one embodiment of a method of dynamically adjusting processing speed based on work-in-process levels, in accordance with the present invention.

FIG. 2 conceptually illustrates one embodiment of a method 200 of dynamically adjusting one or more processing speeds based on work-in-process levels associated with one or more processing tools. In the illustrated embodiment, the work-in-process levels associated with one or more processing tools are determined (at 205). As discussed above, the work-in-process levels associated with one or more processing tools may be determined (at 205) based on information regarding current and/or future processing in a manufacturing system, process flow, or processing tools in the manufacturing system. For example, a queue (or information indicative of the state of the queue) associated with the processing tool may be accessed to determine how many wafers are in the queue and thereby determine (at 205) a work-in-process level associated with the processing tool. For another example, a queue (or information indicative of the state of the queue) associated with a different processing tool in the processing flow or an anticipated volume of wafers expected to be provided to the processing flow may be accessed to predict how many wafers are likely to be processed by the processing tool in the future and thereby determine (at 205) the work-in-process level associated with the processing tool. In alternative embodiments, the work-in-process levels associated with one or more processing tools may be repeatedly determined (at 205) at any time interval, including substantially continuously.

Whether or not the work-in-process level(s) associated with the processing tool has increased may then be determined (at 210). In one embodiment, one or more previous work-in-process levels may be compared to the current work-in-process level to determine (at 210) whether the work-in-process level has increased. However, persons of ordinary skill in the art having benefit of the present disclosure should appreciate that the present invention is not limited to determining (at 210) whether or not the work-in-process levels have increased based on comparisons with previous measurements. In alternative embodiments, other techniques may be used. For example, the current work-in-process level may be compared to one or more threshold values to determine (at 210) whether the work-in-process level(s) has increased above the threshold values.

If the work-in-process level(s) associated with the processing tool has increased (at 210), the processing speed associated with the processing tool may be increased (at 215). The processing speed of a processing tool is typically determined by the operating parameters of the processing tool, which may be specified in an operating recipe. Accordingly, the processing speed associated with a processing tool may be increased (at 215) by modifying an operating recipe associated with the processing tool. For a few examples, the processing speed of a chemical mechanical polishing tool may be varied by varying a platen speed and/or a composition of a polishing agent, the processing speed of an etching tool may be increased or decreased by increasing or decreasing an etching rate, the processing speed of a photolithography tool may be increased or decreased by decreasing or increasing an exposure time and/or increasing or decreasing a light intensity, the processing speed of a deposition tool may be increased or decreased by increasing or decreasing a deposition rate, the processing speed of an ion implantation tool may be varied by varying a dopant concentration. The processing speeds may also be varied by changing a process duration and/or a tolerance associated with the processing. However, these examples are not intended to be exhaustive and persons of ordinary skill in the art should appreciate that many alternatives exist.

If the work-in-process level(s) associated with the processing tool have not increased (at 210), then whether or not the work-in-process level(s) associated with the processing tool has decreased may be determined (at 220). As discussed above, one or more previous work-in-process levels may be compared to the current work-in-process level to determine (at 220) whether the work-in-process level has decreased. However, other techniques may be used, such as comparing the current work-in-process level to one or more threshold values to determine (at 220) whether the work-in-process level(s) has decreased below the threshold values. If the work-in-process level(s) associated with the processing tool has decreased (at 220), the processing speed associated with the processing tool may be decreased (at 225). As discussed above, the processing speed associated with a processing tool may be decreased (at 225) by modifying an operating recipe associated with the processing tool. If the work-in-process level(s) associated with the processing tool have not decreased (at 220), then another work-in-process level may be determined (at 205). Although the embodiment discussed above uses the work-in-process levels, alternative embodiments may instead use information indicative of (or derived from) the work-in-process levels. For example, processing times and/or workloads derived from the work-in-process levels may be used.

Figure 3:
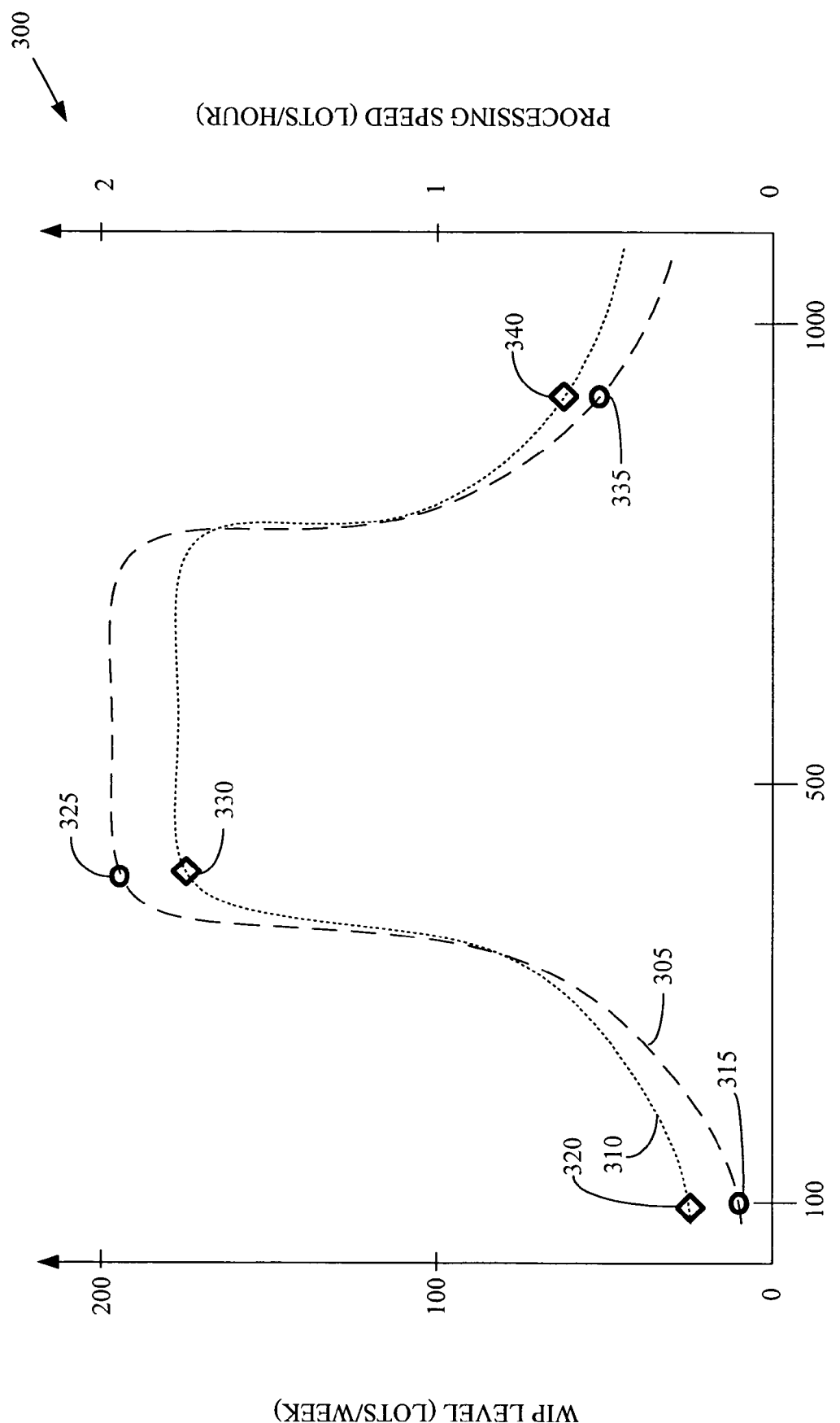
FIG. 3 conceptually illustrates a plot of a work-in-process level and a corresponding processing speed, in accordance with the present invention.

FIG. 3 conceptually illustrates a plot 300 of a work-in-process level 305 associated with a processing tool and a corresponding processing speed 310 associated with the processing tool. In the illustrated embodiment, the horizontal axis indicates a wafer lot identification number that increases from left to right. The left-hand vertical axis indicates a work-in-process level (measured in wafer lots per week) that increases from bottom to top and the right-hand vertical axis indicates a processing speed (measured in wafer lots per hour) that increases from bottom to top.

At approximately lot number 100, the work-in-process level 305 is approximately 10 lots per week and the corresponding processing speed 310 is approximately 0.1 wafer lots per hour, as indicated by data points 315 and 320, respectively. The work-in-process level 305 increases to approximately 200 lots per week at a lot number of approximately 400, as indicated by data point 325. The processing speed 310 is therefore increased to approximately 1.75 wafer lots per hour, as indicated by data point 330. For example, the controller 120 shown in FIG. 1 may increase the processing speed 310 to approximately 1.75 wafer lots per hour based upon the increase in the work-in-process level 305 to approximately 200 lots per week. By increasing the processing speed 310 when the work-in-process level 305 increases, bottlenecks in the processing flow that includes the processing tool may be reduced or avoided and the efficiency of the processing may be increased.

The work-in-process level 305 decreases to approximately 20 lots per week at a lot number of approximately 900 and the processing speed 310 is decreased to approximately 0.5 lots per hour, as indicated by data points 335 and 340, respectively. For example, the controller 120 shown in FIG. 1 may decrease the processing speed 310 to approximately 0.5 lots per hour based upon the decrease in the work-in-process level 305 to approximately 20 lots per week. Lower processing speeds may permit the processing tool to perform operations at higher levels of accuracy and/or control. For example, the processing tool may be able to operate with tighter control limits when allowed to operate at lower processing speeds. Accordingly, decreasing the processing speed 310 when the work-in-process level 305 decreases may improve the accuracy and/or control of the processing performed by the processing tool.

Figure 4:
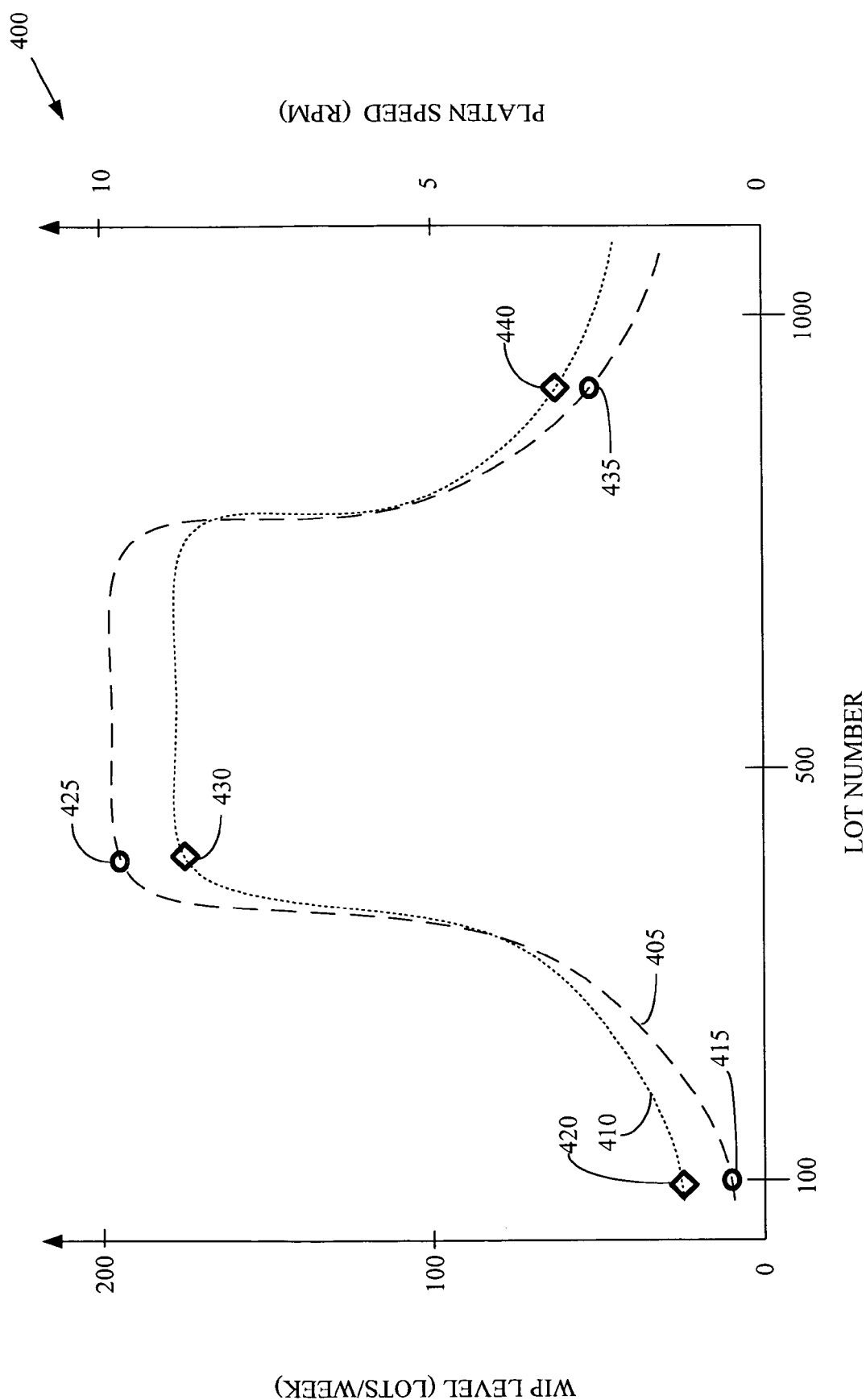
FIG. 4 conceptually illustrates a plot of a work-in-process level associated with a polishing tool and a corresponding polishing speed, in accordance with the present invention.

FIG. 4 conceptually illustrates a plot 400 of a work-in-process level associated with a polishing tool and a corresponding platen speed associated with a polishing tool, such as a chemical mechanical polishing tool. In the illustrated embodiment, the horizontal axis indicates a number of wafer lots that are processed. The number of processed wafer lots increases from left to right. The left-hand vertical axis indicates a work-in-process level (measured in wafer lots per week) that increases from bottom to top and the right-hand vertical axis indicates a platen speed (measured in revolutions per minute) that increases from bottom to top.

At approximately lot number 100, the work-in-process level 405 is approximately 10 lots per week processed at a corresponding platen speed 410, as indicated by data points 415 and 420, respectively. The work-in-process level 405 increases to approximately 200 lots per week at a lot number of approximately 400, as indicated by data point 425. The processing speed 410 is therefore increased to a larger platen speed, as indicated by data point 430. For example, the controller 120 shown in FIG. 1 may increase the processing speed of a chemical mechanical polishing tool by increasing the platen speed 410 to the larger platen speed 430 based upon the increase in the work-in-process level 405 to approximately 200 lots per week. By increasing the platen speed 410 (and thereby increasing the processing speed) when the work-in-process level 405 increases, bottlenecks in the processing flow that includes the processing tool (e.g., the chemical mechanical polishing tool) may be reduced or avoided and the efficiency of the processing may be increased.

The work-in-process level 405 decreases to approximately 20 lots per week at a lot number of approximately 900 and the platen speed 410 (and thereby the processing speed) is decreased, as indicated by data points 435 and 440, respectively. For example, the controller 120 shown in FIG. 1 may decrease the platen speed 410 based upon the decrease in the work-in-process level 405 to approximately 20 lots per week. Lower platen speeds and the consequently lower processing speeds may permit the processing tool to perform operations such as chemical mechanical polishing at higher levels of accuracy and/or control. For example, the chemical mechanical polishing tool may be able to operate with tighter control limits when allowed to operate at lower platen and/or processing speeds. Accordingly, decreasing the platen speed 410 when the work-in-process level 405 decreases may improve the accuracy and/or control of the processing performed by the processing tool.

Figure 5:
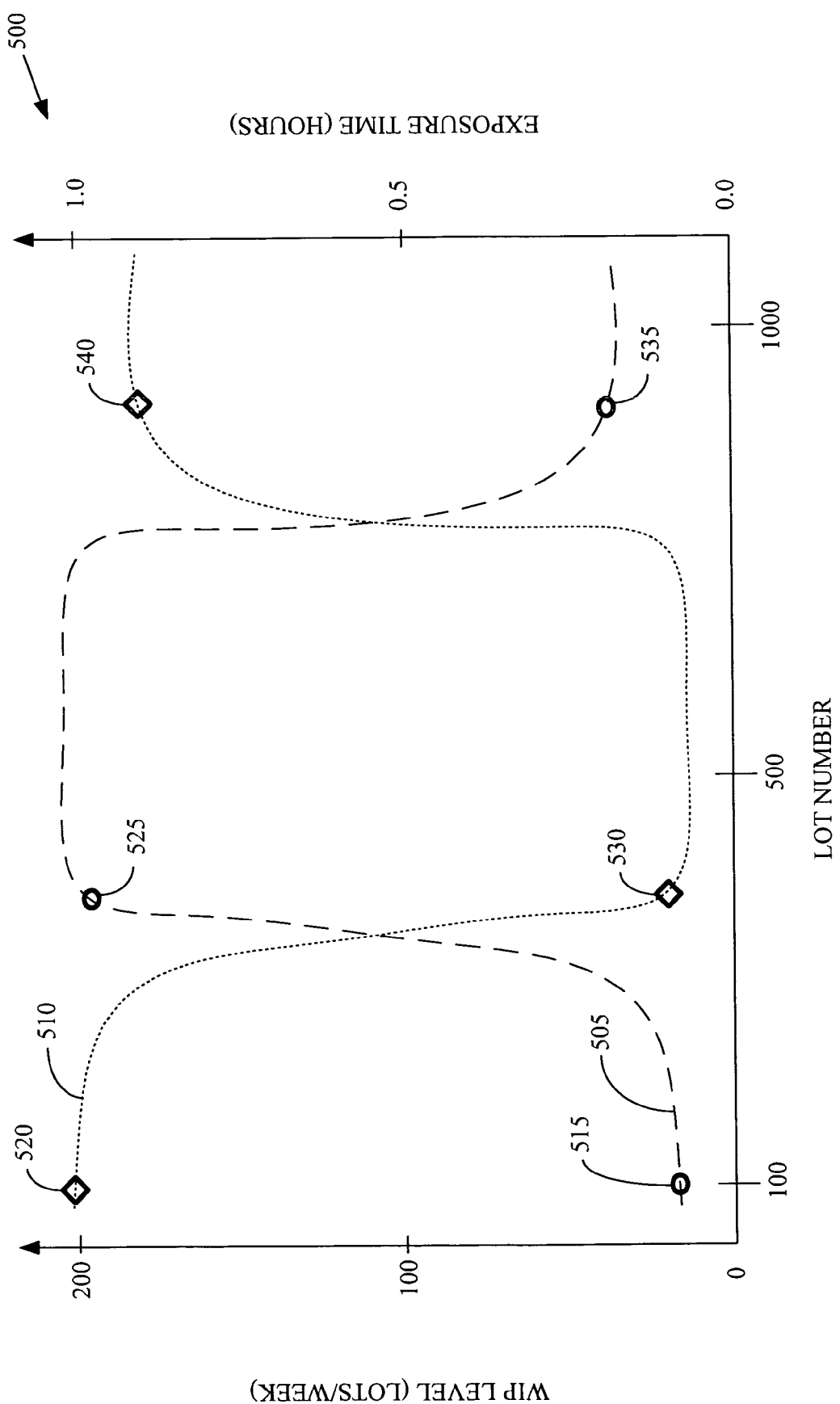
FIG. 5 conceptually illustrates a plot of a work-in-process level associated with a photolithography tool and a corresponding exposure time, in accordance with the present invention.

FIG. 5 conceptually illustrates a plot 500 of a work-in-process level associated with a photolithography tool and a corresponding exposure time. In the illustrated embodiment, the horizontal axis indicates a number of wafer lots that are processed. The number of processed wafer lots increases from left to right. The left-hand vertical axis indicates a work-in-process level (measured in wafer lots per week) that increases from bottom to top and the right-hand vertical axis indicates an exposure time that increases from bottom to top.

At approximately lot number 100, the work-in-process level 505 associated with the photolithography tool is approximately 10 lots per week and the corresponding exposure time 510 is approximately 1 hour, as indicated by data points 515 and 520, respectively. The work-in-process level 505 increases to approximately 200 lots per week at a lot number of approximately 500, as indicated by data point 525. The exposure time 510 is therefore decreased to approximately 0.1 hour, as indicated by data point 530, which increases the processing speed of the photolithography tool. For example, the controller 120 shown in FIG. 1 may increase the processing speed of the photolithography tool by decreasing the exposure time 510 based upon the increase in the work-in-process level 505 to approximately 200 lots per week. By decreasing the exposure time 510 (and thereby increasing the processing speed) when the work-in-process level 505 increases, bottlenecks in the processing flow that includes the processing tool (e.g., the photolithography tool) may be reduced or avoided and the efficiency of the processing may be increased.

The work-in-process level 505 decreases to approximately 20 lots per week at a lot number of approximately 900 and the exposure time 510 is increased to approximately 0.9 hours (and the processing speed is thereby decreased), as indicated by data points 535 and 540, respectively. For example, the controller 120 shown in FIG. 1 may increase the exposure time 510 to approximately 0.9 hours based upon the decrease in the work-in-process level 505 to approximately 20 lots per week. Longer exposure times and the consequently lower processing speeds may permit the photolithography tool to perform operations such as patterning a masking layer at higher levels of accuracy and/or control. For example, the photolithography tool may be able to operate with tighter control limits when allowed to operate at longer exposures and/or slower processing speeds. Accordingly, increasing the exposure time 510 when the work-in-process level 505 decreases may improve the accuracy and/or control of the processing performed by the processing tool.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of operating a semiconductor fabrication facility, comprising:
   determining at least one first work-in-process level associated with a first processing tool, said at least one first work-in-process level indicating a rate at which wafers are being provided to or processed by the first processing tool to form portions of semiconductor devices in or on the wafers; and
   modifying a processing speed associated with the first processing tool based on said at least one first work-in-process level.

2. The method of claim 1, wherein determining said at least one first work-in-process level comprises accessing information indicative of said at least one first work-in-process level.

3. The method of claim 2, wherein accessing information indicative of said at least one first work-in-process level comprises accessing a queue associated with the first processing tool, the queue indicating one or more wafers that are waiting to be processed in the first processing tool.

4. The method of claim 1, wherein determining said at least one first work-in-process level associated with the first processing tool comprises determining at least one second work-in-process level associated with at least one second processing tool, sat least one second work-in-process level indicating a rate at which wafers are being to or processed by the second processing tool to form portions of semiconductor devices in or on the wafers.

5. The method of claim 4, wherein determining said at least one second work-in-process level comprises determining at least one second work-in-process level associated with at least one second processing tool in a process flow including the first processing tool.

6. The method of claim 1, wherein determining said at least one first work-in-process level comprises determining said at least one first work-in-process level based on an anticipated volume of wafers or wafer lots.

7. The method of claim 1, wherein modifying the processing speed associated with the first processing tool comprises modifying an operating recipe associated with the first processing tool.

8. The method of claim 7, wherein modifying the operating recipe comprises modifying at least one of a platen speed, an etching rate, an exposure time, a deposition rate, a dopant concentration, a light intensity, a process duration, and a tolerance.

9. The method of claim 1, wherein modifying the processing speed comprises determining whether said at least one first work-in-process level has increased or decreased.

10. The method of claim 9, wherein modifying the processing speed comprises increasing the processing speed in response to determining that said at least one first work-in-process level has increased.

11. The method of claim 9, wherein modifying the processing speed comprises decreasing the processing speed in response to determining that said at least one first work-in-process level has been decreased.

12. The method of claim 1, wherein modifying the processing speed comprises modifying the processing speed based on at least one of a limit or a range associated with the processing speed.

13. The method of claim 1, further comprising processing at least one wafer at the modified processing speed to form at least a portion of a semiconductor device in or on said at least one wafer.

14. An apparatus, comprising:
   means for determining at least one first work-in-process level associated with a first processing tool said at least one first work-in-process level indicating a rate at which wafers are being provided to or processed by the first processing tool to form portions of semiconductor devices in or on the wafers; and
   means for modifying a processing speed associated with the first processing tool based on said at least one first work-in-process level.

15. A semiconductor fabrication facility, comprising:
   a first processing tool; and
   a control unit configured to:
      determine at least one first work-in-process level associated with the first processing tool said at least one first work-process level indicating a rate at which wafers are being provided to or processed by the first processing tool to form portions of semiconductor devices in or on the wafers; and modify a processing speed associated with the first processing tool based on said at least one first work-in-process level.

16. The apparatus of claim 15, wherein the control unit is configured to access information indicative of said at least one first work-in-process level.

17. The apparatus of claim 16, further comprising a queue associated with the first processing tool, wherein the control unit is configured to access the queue, and wherein the queue indicates one or more wafers that are waiting to be processed in the first processing tool.

18. The apparatus of claim 15, further comprising at least one second processing tool, wherein the control unit is configured to determine at least one second work-in-process level associated with said at least one second processing tool, said at least one second work-in-process level indicating a rate at which wafers are being provided to or processed by the second processing tool to form portions of semiconductor devices in or on the wafers.

19. The apparatus of claim 18, further comprising a processing flow that comprises the first processing tool and said at least one second processing tool.

20. The apparatus of claim 15, wherein the control unit is configured to determine said at least one first work-in-process level based on an anticipated volume of wafers or wafer lots.

21. The apparatus of claim 15, wherein the control unit is configured to modify an operating recipe associated with the first processing tool.

22. The apparatus of claim 21, wherein the control unit is configured to modify at least one of a platen speed, an etching rate, an exposure time, a deposition rate, a dopant concentration, a light intensity, a process duration, and a tolerance.

23. The apparatus of claim 15, wherein the control unit is configured to determine whether said at least one first work-in-process level has increased or decreased.

24. The apparatus of claim 23, wherein the control unit is configured to increase the processing speed in response to determining that said at least one first work-in-process level has increased.

25. The apparatus of claim 23, wherein the control unit is configured to decrease the processing speed in response to determining that said at least one first work-in-process level has been decreased.

26. The apparatus of claim 15, wherein the control unit is configured to modify the processing speed based on at least one of a limit or a range associated with the processing speed.

27. The apparatus of claim 15, wherein the control unit is configured to provide information indicative of the modified processing speed to the first processing tool.

28. The apparatus of claim 15, wherein the first processing tool is configured to process at least one wafer at the modified processing speed to form at least a portion of a semiconductor device in or on said at least one wafer.

* * * * *